United States Patent
Matsuzawa et al.

(10) Patent No.: US 6,182,349 B1
(45) Date of Patent: Feb. 6, 2001

(54) METHOD FOR PRODUCING A SEAMLESS METALLIC BELT

(75) Inventors: Kouzaburo Matsuzawa, Tokyo; Atsushi Fujii; Akira Funaki, both of Himeji, all of (JP)

(73) Assignee: Idemitsu Petrochemical Co., Ltd., Tokyo (JP)

( * ) Notice: Under 35 U.S.C. 154(b), the term of this patent shall be extended for 0 days.

(21) Appl. No.: 08/828,407

(22) Filed: Mar. 28, 1997

(30) Foreign Application Priority Data

Apr. 1, 1996 (JP) .................................................. 8-078802

(51) Int. Cl.$^7$ ................. B23Q 3/14; B26D 3/00
(52) U.S. Cl. .................... 29/527.6; 82/169; 269/48.1; 279/2.01; 83/54
(58) Field of Search .................... 29/527.6; 269/48.1; 82/1.11, 169; 279/2.01, 2.07, 2.08; 72/203, 368; 83/54

(56) References Cited

U.S. PATENT DOCUMENTS

| 1,332,592 | 3/1920 | Baker . |
| 3,685,475 | * 8/1972 | Banks, Jr. ................................. 72/69 |
| 3,986,654 | * 10/1976 | Hart et al. ............................... 72/368 |

FOREIGN PATENT DOCUMENTS

| 57-163750 | 10/1982 | (JP) . |
| 61-180631 | 8/1986 | (JP) . |
| 6-50391 | 2/1994 | (JP) . |

OTHER PUBLICATIONS

Patent Abstracts of Japan. vol. 013, No. 399 JP 01–142021, Jun. 2, 1989 (1 page).
Patent Abstracts of Japan. vol. 006, No. 186 JP 57–101615, Jun. 24, 1982 (1 page).

* cited by examiner

Primary Examiner—P. W. Echols
(74) Attorney, Agent, or Firm—Flynn, Thiel, Boutell & Tanis, P.C.

(57) ABSTRACT

A method for producing a seamless metallic belt without a welded line and capable of being easily produced in high accuracy. A seamless belt material 21 having a defined length as a whole is placed on a core 11 and is held in a stretching state on the core 11 thermally expanded by heating, and further, in the above state, an outer circumference of the belt material 21 is cut to a predetermined thickness. The seamless metallic belt 20 is obtained by removing after the core 11 is cooled.

15 Claims, 3 Drawing Sheets

METHOD FOR PRODUCING A SEAMLESS METALLIC BELT

BACKGROUND OF THE INVENTION

1. Field of the Invention

This invention relates to a method for producing a seamless metallic belt, which is capable of use as a belt for a conveyor.

2. Description of the Related Art

Conventionally, an endless metallic belt, which is formed out of thin-plane shaped metallic material, is used for a belt of a conveyor.

This type of endless metallic belt is used for a belt for molding a synthetic resin film, a synthetic resin sheet, a synthetic resin board or the like. Particularly, a mirror belt finished to a mirror surface is used for producing an optical film, sheet, board or the like, that requires a very smooth surface.

As material of the aforementioned endless metallic belt, various metals are properly used especially, stainless material (SUS) inhabiting a generation of a rust and so on is heavily used for the mirror finished belt in order that evenness of the surface is not impaired.

The aforementioned endless metallic belts are produced with, for example by, a method in which a metallic plate processed by metal rolling is to be a banded shape and the endless belt is resulted by welding both of the ends of the banded metallic plate in another method in which a metallic pipe is formed, by metal rolling and the thin endless belt is resulted by enlarging the diameter of a loop of the metallic pipe, and so on. The endless belt produced with metal rolling is called as a seamless metallic belt or the like in view of no joint line like end-welding.

In the aforementioned conventional producing method, however, the following disadvantages are listed. Disadvantages of the producing method with end-welding for the banded metallic plate.

In the producing method with end-welding for the banded metallic plate, the mechanical strength of a welded portion is reduced to approximately 50–70% as compared with another portions of the main body. Thereby allowing disadvantages in which the welded portion becomes expanded (necking) with the use, and further, degradation, weld crack, rupture and so on easily appear by repeatedly bending.

In order to ensure long-lasting use of the endless belt with end-welding, it is required that the diameter of rollers run thereon with the endless belt is defined as more than 1,000 times of the thickness of the endless belt, curvature radius is defined to be larger so as not to concentrate large force on the welded portion, and so on. As a result, a disadvantage in which a device using the endless belt is not allowed to be small sized.

On the endless belt with end-welding, the welded portion becomes changed as compared with another portions of the main body and brought about necking over time even on the mirror finished belt, resulting in a disadvantage of faulty appearance, such as optical anisotropy and the like.

Disadvantages of the producing method with pipe metal rolling

In the producing method with pipe-metal rolling, there is a disadvantage of need of a large special apparatus in the manufacture.

In view of manufacturing with metal rolling of the pipe, there is a disadvantage in which it is difficult that the dimemsional accuracy of the thickness of the belt and the like is increased, particularly, it is seriously difficult that all the circumferential length of the belt is produced in high accuracy.

It is an object of the present invention to provide a method for producing a seamless metallic belt without a welded line and capable of being easily produced in high accuracy.

SUMMARY OF THE INVENTION

The present invention is a method for producing a seamless endless metallic belt formed out of thin-plane shaped metallic material, which is characterized by the step of cutting an outer circumferential face of a seamless belt material to create a thickness of the belt as a whole.

In the present invention as described above, the belt material is made thinner by cutting the outer circumference of the metal-made belt material of a pipe-shape or the like, thus obtaining an endless belt.

The endless belt is a seamless belt, because there is no seam on the original belt material.

In the process the outer circumference of the belt material is rotating-cut while the inner circumference is retained in a perfect circle or in similar ways, thereby allowing thickness to be controlled with high accuracy.

The circumferential length of the seamless belt has a dependence on the whole circumferential length of the belt material with high accuracy in the stage of the belt material. The inner circumferential length of the belt material is precisely found by cutting the inner circumferential face of the belt material. Therefore, the whole circumferential length of the seamless belt is also controlled with high accuracy.

In view of above description, the seamless metallic belt having an accurate thickness and along its complete circumferential length without a seam is obtained.

When the belt material is cut, it is advisable to place the belt material on an outer circumference of a core shaped so that the outer circumference is a tubular face and the outer diameter is a predetermined length smaller than the inner diameter of the belt material. The core is thermally expanded to cause an inner circumference of the belt material to contact the outer circumference of the core with pressure. Then, the outer circumferential face of the belt material is cut to create the constant thickness of the belt as a whole while the above process is maintained. Finally, the belt material is removed from the core by cooling and shrinking the core after the cutting process.

As a result, the belt material of a predetermined length can be certainly held by using the thermal expansion and shrinkage of the core (namely, "tight-fit").

Insofar as the core is formed from a homogeneous material to have the outer circumference in the shape of a perfect circle with high accuracy, the roundness of the outer circumferential face is maintained even when the core thermally expands.

This allows the inner circumference of the belt to be maintained in the perfect circle with high accuracy in the process that the belt material is cut, the structure and the placing process to be simple, and the accurate thickness to be achieved.

It is advisable that the material used to form the belt is any one of stainless steel, carbon steel, precipitation hardening type steel and titanium alloy.

When the above materials are used as the required high-function belt, effect of the present invention sufficiently comes into play.

It is advisable that the belt material is initially shaped by using any one of the following processes extrusion molding, pultrusion molding, casting, centrifugal casting and forging.

In view of the aforementioned processes, the even belt material without any seam on the whole circumference can be obtained, thus further improving quality of the seamless metallic belt produced by using the present invention.

It is advisable that the belt material has a thickness from 50 micron to 2 mm after the cutting process.

DETAILED DESCRIPTION OF THE PREFERRED EMBODIMENT(S)

The preferred embodiment according to the present invention will be explained below with reference to the attached drawings.

Figure 5:
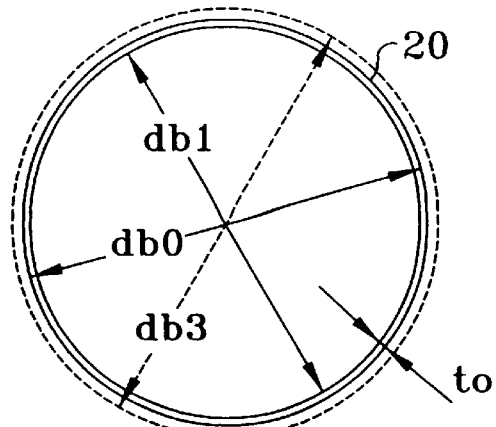
FIG. 5 is a schematic view showing a seamless metallic belt of the preferred embodiment.

In the embodiment, a seamless metallic belt 20 (see FIG. 5) is produced to adjust the thickness and the circumferential length in accuracy by the steps of forming a tubular belt material from metallic raw material of stainless steel or the like, and cutting the outer circumferential face of the belt material.

Figure 1:
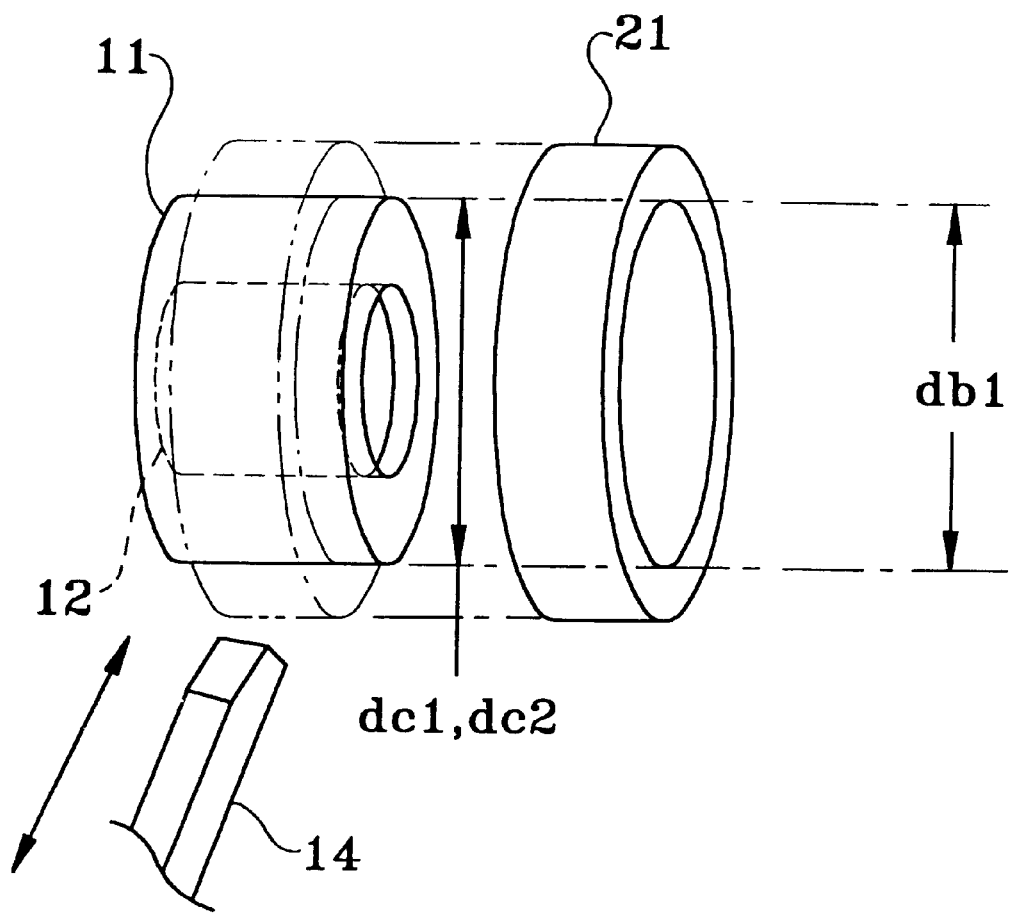
FIG. 1 is a disintegrated perspective view showing the preferred embodiment of the present invention.

In FIG. 1, a core 11 is a metallic cylinder made of aluminium or the like and excellent in thermal conductivity, is used as jig for forming the seamless metallic belt to cut the outer circumferential face of a belt material 21.

A cartridge type heater 12 is provided in the core 11 to heat the core 11 to a required temperature and is operated from the outside.

The core 11 is a sectional perfect circle, which has an outer diameter dc1 in a cooling state and an outer diameter dc2 in a heated state by the heater 12 due to the thermal expansion.

Therefore, the belt material 21 having an inner diameter db1, (dc2>db1>dc1) can be fitted on the outer circumferential face of the core 11 when the core 11 is cool. At this point, the core 11 expands through heating, whereupon the outer circumferential face of the core 11 completely abuts the whole inner circumferential face of the belt material 21, thereby fittingly holding the belt material 21 in a stretched state.

Incidentally, the core 11 may be cooled with air cooling, and also may be constructively cooled by providing a cooling means such as a water-cooled type or the like in the core 11. Alternatively, a cooling means such as an air blower type may be provided adjacent the core 11.

Figure 2:
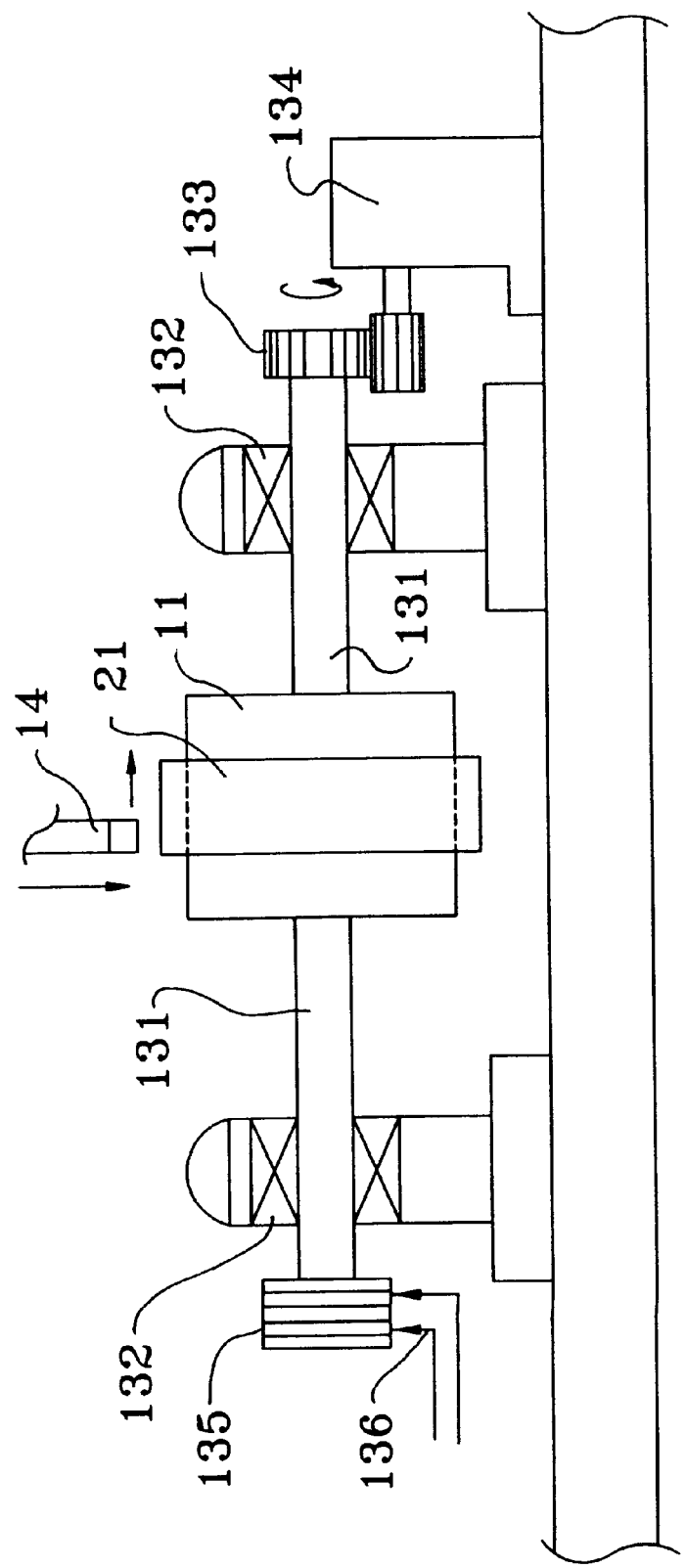
FIG. 2 is a schematic side elevational view showing structure of a device for cutting the outer circumference on the preferred embodiment.

A known lathe or miller can be appropriately used for cutting the outer circumferential face, for example, a device 13 shown in FIG. 2 can be employed.

In FIG. 2, the core 11 is mounted on a support shaft 131.

The support shaft 131 is rotatably supported with a pair of bearings 132, in which the core 11 is sandwiched or passed through in the axial direction, thereby the axis of the core 11 is supported to agree with the support shaft 131.

A gear 133 and a motor 134 are provided at an end of the support shaft 131 to rotate the support shaft 131 and the core 11.

At the other end of the support shaft 131, a slip ring 135 is provided. A slip brush 136 connected to a power source of the outside is slidably moved against the slip ring 135 and provides power for the heater 12 in the rotating core 11.

Adjacent to the core 11 located on the support shaft 131, a cutting tool 14 is positioned to cut the outer circumferential face of the belt material 21 fittingly mounted on the outer circumference of the core 11.

The cutting tool 14 is supported by a cutting-tool attached portion provided in the device 13 to be precisely moved relative to the core 11 by the moving system (the above structure is well-known and omitted to be shown in a drawing).

This allows the cutting tool 14 to be proximate to and spaced from the rotating core 11, with the result that the cut thickness of the belt material 21 is determined, and further, allowing it to be moved in the axial direction of the core 11 with a process of cutting, with the result that all the outer circumferential face of the belt material 21 mounted on the core 11 is allowed to be precisely cut.

When the seamless metallic belt 20 is produced by using the aforementioned device, the following steps are performed.

Figure 3:
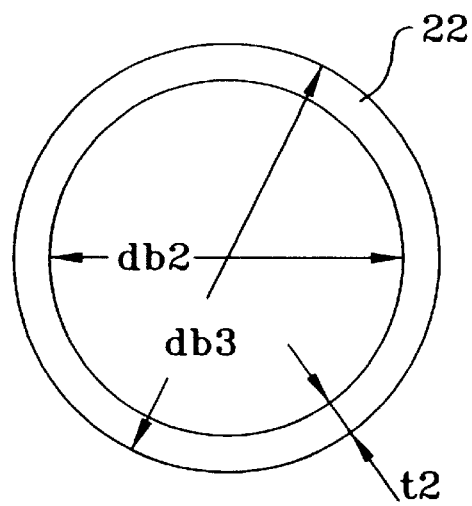
FIG. 3 is a schematic view showing a tubular material of the preferred embodiment.

First, the metal raw-material, the workpiece, used to form the seamless metallic belt 20, is processed to form the tubular material 22 (see FIG. 3).

For the metal raw-material, it is advisable to use any one of the following, stainless steel, carbon steel, precipitation hardening type steel, and titanium alloy.

For forming the tubular material 22, a known process, such as forging, extrusion, pultrusion, casting, centrifugal casting or the like, which is capable of forming the tubular material 22 without a seam, can be used.

The formed tubular material 22 is formed to have a sufficiently smaller inner diameter db2 than the outer diameter dc1 of the core 11 when cool, and a predetermined thickness t2 a larger outer diameter db3 than the inner diameter db2.

Figure 4:
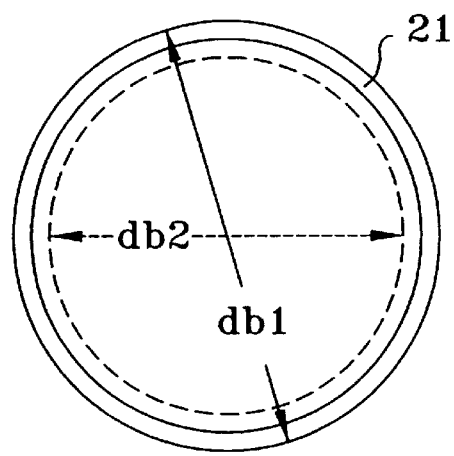
FIG. 4 is a schematic view showing a belt material of the preferred embodiment.

The belt material 21 is formed by cutting the inner circumferential face of the tubular material 22 to make a perfect circle having inner diameter db1 (see FIG. 4).

For cutting the inner circumferential face, a known process, such as a honing process, spinning process or the like, can be used.

At this time, the inner diameter db1 of the belt material 21 is adjusted with precision to be a size in which the entire circumferential length of the inner circumferential face is set to be the circumferential length required as the seamless metallic belt 20.

Continuously, the belt material 20 is mounted onto the core 11, and further, the core 11 is placed to the device 13 for cutting the outer circumference.

When the belt material 21 is mounted onto the core 11, the core 11 is already cooled, and the belt material 21 is passed from the upper end of the core 11 to be located on the outer circumferential face of the core 11.

Then, the core 11 is heated by the heater 12 to be expanded, so that the belt material 21 is held on the outer circumferential face of the core 11 in a stretching state.

After the belt material 21 is mounted, the device 13 is operated to rotate the core 11 and to cause the cutting tool 14 to abut against the outer circumferential face of the belt material 21 mounted on the core 11. Then, the outer circumferential face is uniformly and precisely cut across all the circumference and all the width.

The cutting process is performed until the thickness of the belt material 21 reaches to, consequently, wherein the outer diameter db0 is formed, the seamless metallic belt 20 having the inner diameter db1 is also formed.

After the cutting process, the core 11 is stopped from rotating and cooled by turning off the heater 12 to release the stretched hold of the seamless metallic belt 20, and then the seamless metallic belt 20 is removed from the core 11.

As a result, the seamless metallic belt 20 is produced with accuracy of the thickness and the whole circumferential length.

Incidentally, the heater 12 used in the embodiment is not limited to the use of the electrothermal type, and may appropriately use, for example, a circulating type of hot-water or the like.

In the above embodiment, the core 11 is thermally expanded in a heated state by means of the heater 12 provided therein so as to hold the belt material 21 in a stretching state. Alternatively, the belt material 21 may be located on the core 11, shrunk to a smaller than normal diameter in a cooling state by a cooling means provided therein, and be held in a stretching state after the core 11 returns in a room temperature. Heating by the heater, however, brings a simpler structure of a device.

Further, in the above embodiment, the belt material 21 is held in a stretching state by expanding the core 11 while heated, but the present invention it is not always necessary to use the core in cutting the outer circumference, and the belt material may be cut in other ways to create a constant thickness. For example, the belt material can be sequentially delivered to a place for cutting, touching the cutting tool on the surface of the belt material while being slid on the surface of a level base, and in similar ways.

The following is an explanation as to an experiment for producing the seamless metallic belt 20 based on the aforementioned embodiment.

(1) The tubular material 22 is formed with a precipitation hardening type steel (SUS630) by using a centrifugal casting method (the inner diameter db2=900 mm, the outer diameter db3 =1,000 mm, the width of circumferential face (the length in the axial direction)=1,000 mm). The formed tubular material 22 is resulted in the belt material 21 having the inner diameter db1=950.0 mm by undergoing the honing process for the inner circumferetial face.

(2) The belt material 21 is placed on the core 11 having a room temperature. The core 11 is made of an aluminum alloy, in which has the outer diameter dc1=949.5 mm in a room temperature, and the part of the core 11, corresponding to the cartridge heater 12 provided therein, has the inner diameter 910 mm and the width of circumferential face 1,500 mm. The core 11 placed thereon with the belt material 21 is mounted on the lathe, and the surface temperature of the core 11 is defined as 80° C. by the heater 12 so as to cause the belt material 21 to be held on the outer circumference of the core 11 in a stretching state.

(3) During the above state, the core 11 is rotated to cut the outer circumferential face of the belt material 21 until the outer diameter is 952.0 mm. While the surface temperature T of the core 11 is increased based on the following equation (Equation 1), the outer circumferential face of the belt material 21 is further cut, with result that the seamless metallic belt 20 having the thickness t0=0.54 mm is formed. Incidentally, in Equation 1, t means the thickness of the belt material 21 (t<2 mm).

$$T=-25t+130 \quad \text{Equation 1}$$

(4) The core 11 is cooled to a room temperature, and the seamless metallic belt 20 is removed. After that, the seamless metallic belt 20 is provided with a mirror finish by performing abrasive polishing on the surface thereon with a conventional method. The obtained mirror finished seamless metallic belt 20 has a surface-roughness Ra of 0.007 micron and the thickness of 0.5 mm.

(5) The mirror finished seamless metallic belt 20 undergoes an endurance test by being wound on a pair of rollers. In the test, two rollers each having the outer diameter of 250 mm are located approximately 1,100 mm between their centers. The belt 20 is wound on the rollers and rotated. Further, one of the above rollers is added with tractive force by a hydraulic cylinder in a direction distance from the other roller. As a result, bending stress is repeatedly added to the power of ten raised to the seventh power, but degradation and weld crack do not appear on the surface.

(6) As comparison, the aforementioned material (SUS630) is formed to be a belt shape having the thickness of 0.55 mm with the metal rolling method, and then resulted in the endless belt by performing argon TIG welding on both of the ends of the material. The obtained endless belt is polished to have a mirror face and resulted in the surface-roughness Ra=0.007 micron and the thickness of 0.5 mm. The above endless belt undergoes the aforementioned endurance test. As a result, weld crack appears on the end of the welded line by repeatedly adding stress in 29,000 times. And further, the welded line is extended and the mirror face is degenerated.

What is claimed is:

1. A method for producing a seamless, continuous metallic belt, said method including the steps of:

providing a seamless, tubular metal workpiece, the workpiece having an inner circumferential face and an outer circumferential face, wherein the workpiece has an inner circumferential diameter;

placing the workpiece on a core, the core being substantially at room temperature and having a circular cross sectional profile and a diameter less than the inner circumferential diameter of the workpiece;

heating the core so that an outer surface of the core expands and contacts and engages the inner circumferential face of the workpiece to hold the workpiece to the core;

while increasing the surface temperature of the core, which remains in engaging contact with the workpiece, carving material from the outer circumferential face of the workpiece by applying a cutting tool against the outer circumferential face while rotating the core and the workpiece wherein, in said carving step, material is removed from the workpiece to provide the workpiece with a select outer diameter so as to form a belt having a constant thickness;

cooling the core so as to cause thermal contraction of the core away from the belt; and removing the belt from the contracted core.

2. The method for producing the seamless metallic belt according to claim 1, wherein the material used as a workpiece is one from the group consisting of stainless steel, carbon steel, precipitation hardening type steel and titanium alloy.

3. The method for producing the seamless metallic belt according to claim 1, wherein the workpiece is shaped to have a tubular shape by one from the following group of processes: extrusion molding, pultrusion molding, casting, centrifugal casting and forging.

4. The method for producing the seamless metallic belt according to claim 1, wherein, as a result of said step of removing material from the inner circumferential face of said workpiece and said step of carving material from the outer circumferential face of said workpiece, the belt has a thickness from between 50 microns to 2 mm.

5. The method for producing the seamless metallic belt according to claim 1, wherein the core is made of aluminum alloy.

6. The method for producing the seamless metallic belt according to claim 1, wherein the core is provided therein with a heater of a cartridge type and the heater is actuated to cause said expansion of said core.

7. The method for producing a seamless, continuous metallic belt of claim 1, wherein in said step of cooling the core, the core is cooled to room temperature.

8. The method for producing a seamless, continuous metallic belt of claim 7, wherein in said step of cooling the core, the core is air cooled by turning off a heater.

9. The method for producing a seamless, continuous metallic belt of claim 7, wherein in said step of cooling the core, a supplemental cooling device comprising an air blower is employed to cool the core.

10. The method for producing a seamless, continuous metallic belt of claim 7, wherein in said step of heating the core, the core is heated to a temperature of 80° C.

11. The method for producing a seamless, continuous metallic belt of claim 1, wherein in said step of heating the core, the core is heated to a temperature of 80° C.

12. A method for producing a seamless, continuous metallic belt, said method including the steps of:

providing a seamless, tubular metal workpiece, the workpiece having an inner circumferential face and an outer circumferential face, wherein the workpiece has an inner circumferential diameter;

placing the workpiece on a core, the core having a circular cross sectional profile and a diameter less than the inner circumferential diameter of the workpiece;

heating the core with a heater so that an outer surface of the core expands and contacts and engages the inner circumferential face of the workpiece to hold the workpiece to the core;

carving material from the workpiece while the surface temperature of the core is at a constant value;

while increasing the surface temperature of the core, which remains in engaging contact with the workpiece, carving material from the outer circumferential face of the workpiece by applying a cutting tool against the outer circumferential face while rotating the core and the workpiece wherein, in said carving step, material is removed from the workpiece to provide the workpiece with a select outer diameter so as to form a belt having a constant thickness;

turning off the heater only to cool the core so as to cause thermal contraction of the core away from the belt; and removing the belt from the contracted core.

13. The method for producing a seamless, continuous metallic belt of claim 12, wherein:

prior to said step of placing the workpiece on the core, the core is at room temperature; and in said step of cooling the core, the core is cooled to room temperature.

14. The method for producing a seamless, continuous metallic belt of claim 13, wherein in said step of heating the core, the core is heated to a temperature of 80° C.

15. The method for producing a seamless, continuous metallic belt of claim 12, wherein in said step of heating the core, the core is heated to a temperature of 80° C.

* * * * *